United States Patent
Lin

(10) Patent No.: US 7,364,410 B2
(45) Date of Patent: Apr. 29, 2008

(54) PRESSURE STORAGE STRUCTURE FOR USE IN AIR

(75) Inventor: Dah-Shan Lin, PO Box 82-144, Taipei (TW)

(73) Assignees: Dah-Shan Lin, Taipei (TW); Yun-Cheng Hsu, Taipei (TW)

( * ) Notice: Subject to any disclaimer, the term of this patent is extended or adjusted under 35 U.S.C. 154(b) by 638 days.

(21) Appl. No.: 10/945,985

(22) Filed: Sep. 22, 2004

(65) Prior Publication Data

US 2005/0180863 A1   Aug. 18, 2005

(30) Foreign Application Priority Data

Feb. 15, 2004   (TW) .............................. 93103640 A

(51) Int. Cl.
*F04B 17/02* (2006.01)

(52) U.S. Cl. ...................................... 417/334; 417/470

(58) Field of Classification Search ................ 417/334, 417/336, 470
See application file for complete search history.

(56) References Cited

U.S. PATENT DOCUMENTS

| | | | | |
|---|---|---|---|---|
| 1,517,461 A | * | 12/1924 | Robinson | ..................... 417/334 |
| 2,110,393 A | * | 3/1938 | Edwards | ..................... 417/336 |
| 2,539,862 A | * | 1/1951 | Rushing | ..................... 417/336 |
| 4,115,034 A | * | 9/1978 | Smith | .......................... 417/334 |
| 4,368,692 A | * | 1/1983 | Kita | ............................ 417/334 |
| 4,671,742 A | * | 6/1987 | Gyimesi | ..................... 417/334 |

\* cited by examiner

*Primary Examiner*—Michael Koczo, Jr.
(74) *Attorney, Agent, or Firm*—Leong C. Lei

(57) ABSTRACT

A pressure storage structure for use in air is disclosed. The structure has a main body characterized in that the main body has been secured and the main body includes a plurality of air chambers, each chamber has an open end, and the chamber contains a piston, an elastic member, a unidirection air outlet, a unidirection valve for inlet air and a unidirection inlet, a unidirection valve for outlet air, the piston is provided with a protruded section protruded from the open end out of the air chamber, the structure includes a wind mill positioned to the main body and the wind mill has a rotating shaft pivotally connected to the main body and the rotating shaft is provided with a plurality of blades and rollers, such that the rollers and the protruded sections are in contact and the unidirection outlet of each air chamber is connected to a storage cylinder, the storage cylinder is provided with a pressure plug, an elastic member, an air inlet, a single direction inlet valve and a gas outlet, a unidirectional valve for outlet air, such that when the blades are rotated by the rotating shaft driven by wind the rollers pass over the protruded sections so that the plug moves inward and the gas is delivered to the storage cylinder.

3 Claims, 5 Drawing Sheets

PRESSURE STORAGE STRUCTURE FOR USE IN AIR

BACKGROUND OF THE INVENTION (a) Technical Field of the Invention

The present invention relates to pressure storage structure, and in particular, to a pressure storage structure for use in air, wherein wind generates power so that air produces pressure and the air is stored for application when it is released.

(b) Description of the Prior Art

Conventional power generation devices are found and the power is generated via hydro-electro nuclear energy, and wind power. The advantage of nuclear power is that it provides long term supply of electricity, and the cost of electricity is low. However, it could be disastrous if the devices for nuclear power are not properly handled. As for wind energy, the disadvantages are that wind may not consistent and the strength of the wind is sometimes too weak.

Accordingly, it is an object of the present invention to provide a pressure storage structure for use in air which mitigates the above drawbacks.

SUMMARY OF THE INVENTION

An object of the present invention is to provide a pressure storage structure for use in air having a main body characterized in that the main body has been secured and the main body includes a plurality of air chambers, each chamber has an open end, and the chamber contains a piston, an elastic member, a unidirection air outlet, a unidirection valve for inlet air and a unidirection inlet, a unidirection valve for outlet air, the piston is provided with a protruded section protruded from the open end out of the air chamber, the structure includes a wind mill positioned to the main body and the wind mill has a rotating shaft pivotally connected to the main body and the rotating shaft is provided with a plurality of blades and rollers, such that the rollers and the protruded sections are in contact and the unidirection outlet of each air chamber is connected to a storage cylinder, the storage cylinder is provided with a pressure plug, an elastic member, an air inlet, a single direction inlet valve and a gas outlet, a unidirectional valve for outlet air, such that when the blades are rotated by the rotating shaft driven by wind the rollers pass over the protruded sections so that the plug moves inward and the gas is delivered to the storage cylinder, and the air within the cylinder is increasing until the predetermined pressure is achieved, the stored pressure in the storage cylinder passes through the gas unidirectional outlet.

A further object of the present invention is to provide a pressure storage structure for use in air, further includes a storage main cylinder and a plurality groups of windmill, and each group of windmill has a storing cylinder and each storing cylinder is connected in series or in parallel to the storing main cylinder, and the storing main cylinder includes a pressure plug, an elastic member, a gas unidirection inlet, a unidirectional air inlet valve and a unidirection outlet and a unidirectional valve for air outlet.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
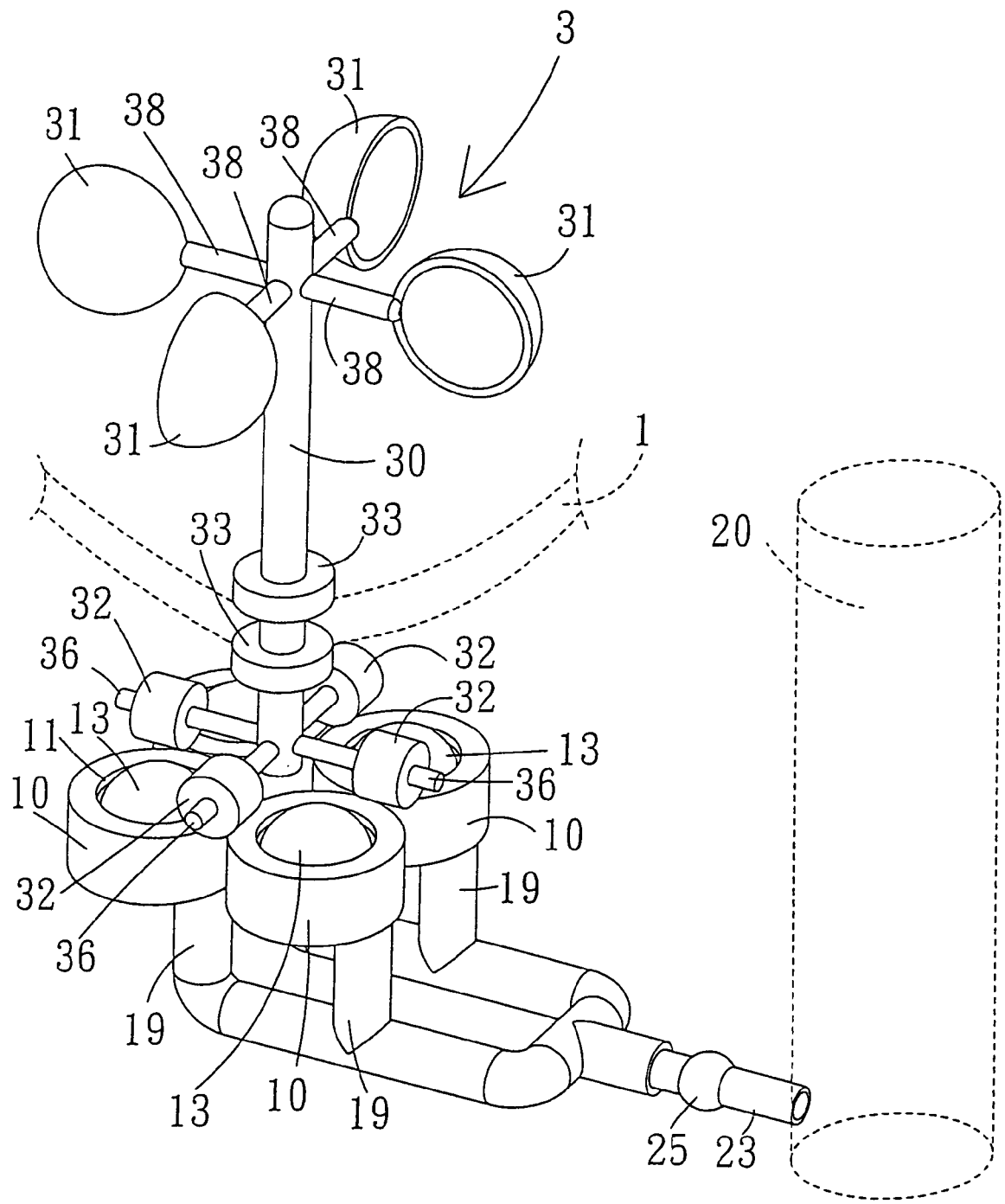
FIG. 1 is a perspective view of a pressure storage structure for use in air of the present invention.
Figure 2:
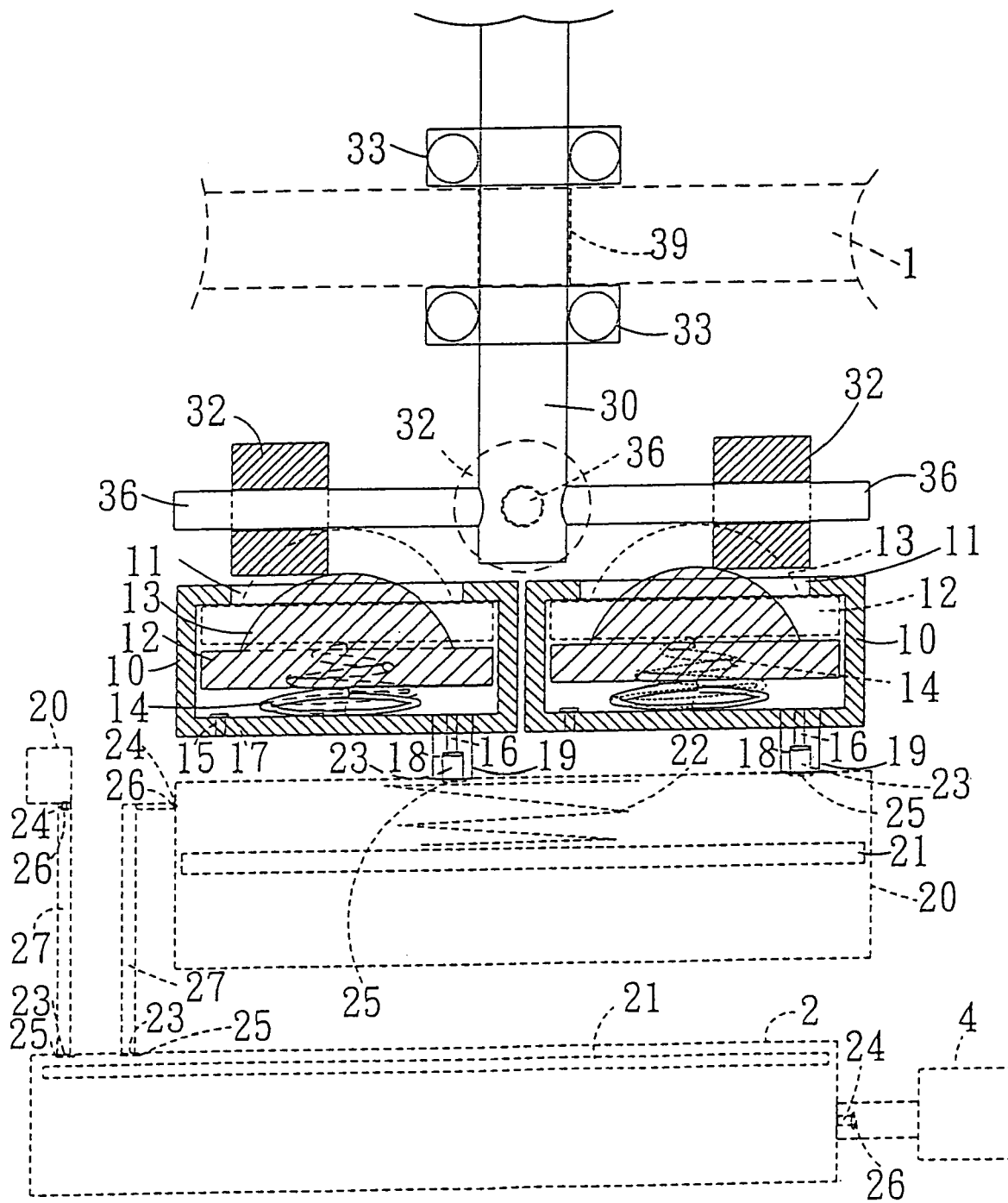
FIG. 2 is a sectional view of the present invention, wherein the storing cylinder is shown schematically.

Referring to FIGS. 1 and 2, there is shown a pressure storage structure for use in air comprising a main body 1, which is secured and positioned at a connection face such as the ground or the balcony of a building, or a floating body on the water surface. The main body 1 is provided with a plurality of air chambers 10, and each chamber 10 is hollow. One end of the air chamber (the top end) has an open end 11 having mounted with a piston 12. The piston 12 has a protruded section 13 which protrudes from the open end 11 under normal condition. The protruded section 13 is a semicircular shape member, and the protruded section 13 can contact with each roller 32 at the lower section of a windmill 3 having a plurality of blades 31. The windmill 3 has a rotating shaft 30 which is supported by a bearing 33 to the main body 1 such that the windmill 3 is positioned to the main body 1. Each chamber 10 is also fixed to the main body 1. The storing cylinders 20, 2 which will be described hereinafter are also fixed to the main body 1.

The piston 12 of the air chamber 10 is sealed against the wall of the air chamber with at least one piston ring so that the piston 12 moves within the air chamber 10. Between the bottom face of the piston 12 and the bottom face of the air chamber 10 is a spring 14. The spring 14 is a conic shaped spring and when the spring is compressed it is coiled. The spring 14 can be all shapes of spring 14. The air chamber 10 is provided with a unidirectional air outlet 16 and a unidirectional air inlet 15, both the outlet 16 and inlet 15 are connected to an air inlet unidirectional valve 17 and an air outlet unidirectional valve 18. The unidirectional air outlet 16 of each air chamber 10 is connected in series to a leading tube 19 and a storing cylinder 20, (or 2) in parallel.

Figure 4:
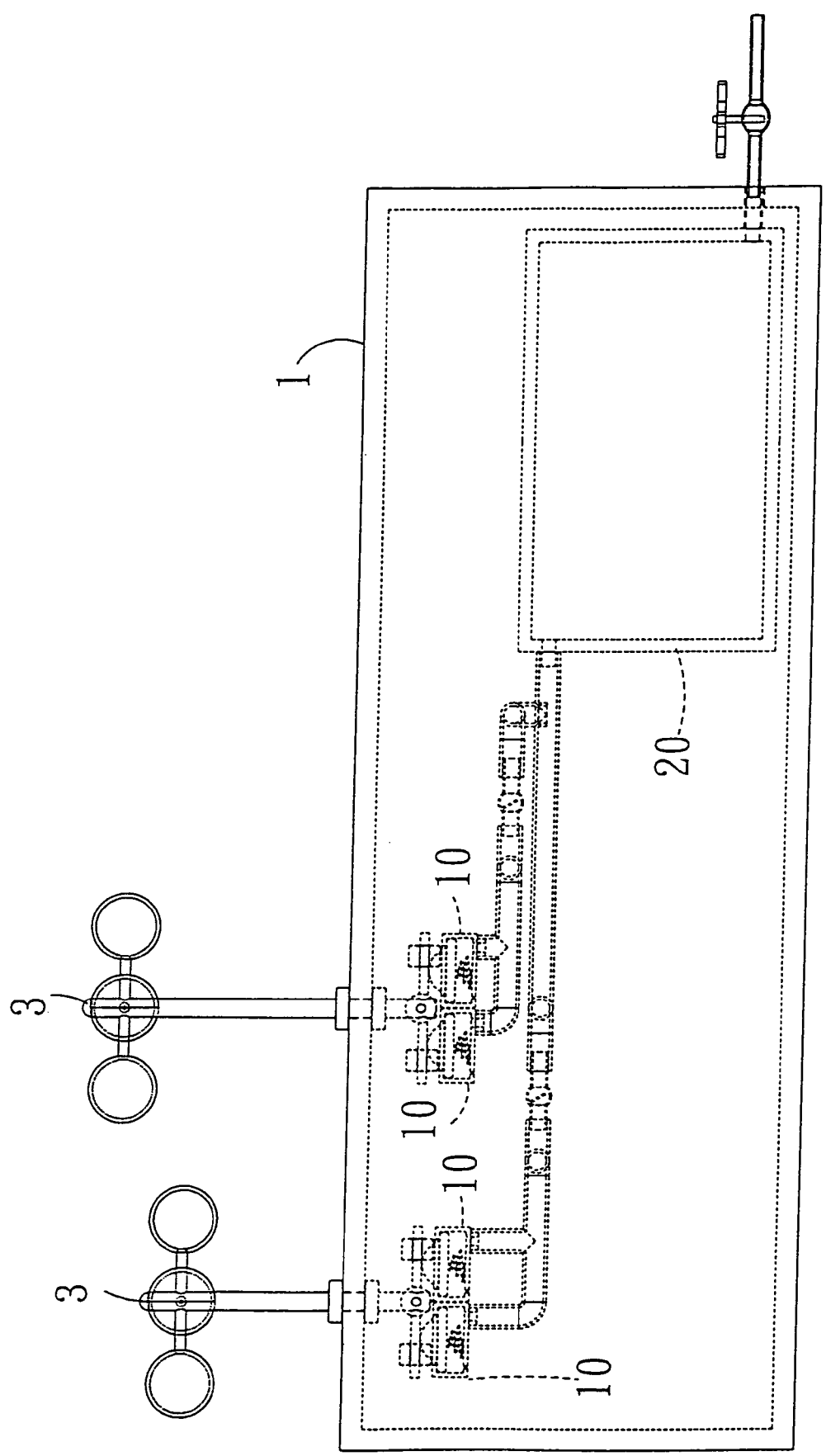
FIG. 4 is a schematic view showing two groups of windmill in accordance with the present invention.
Figure 5:
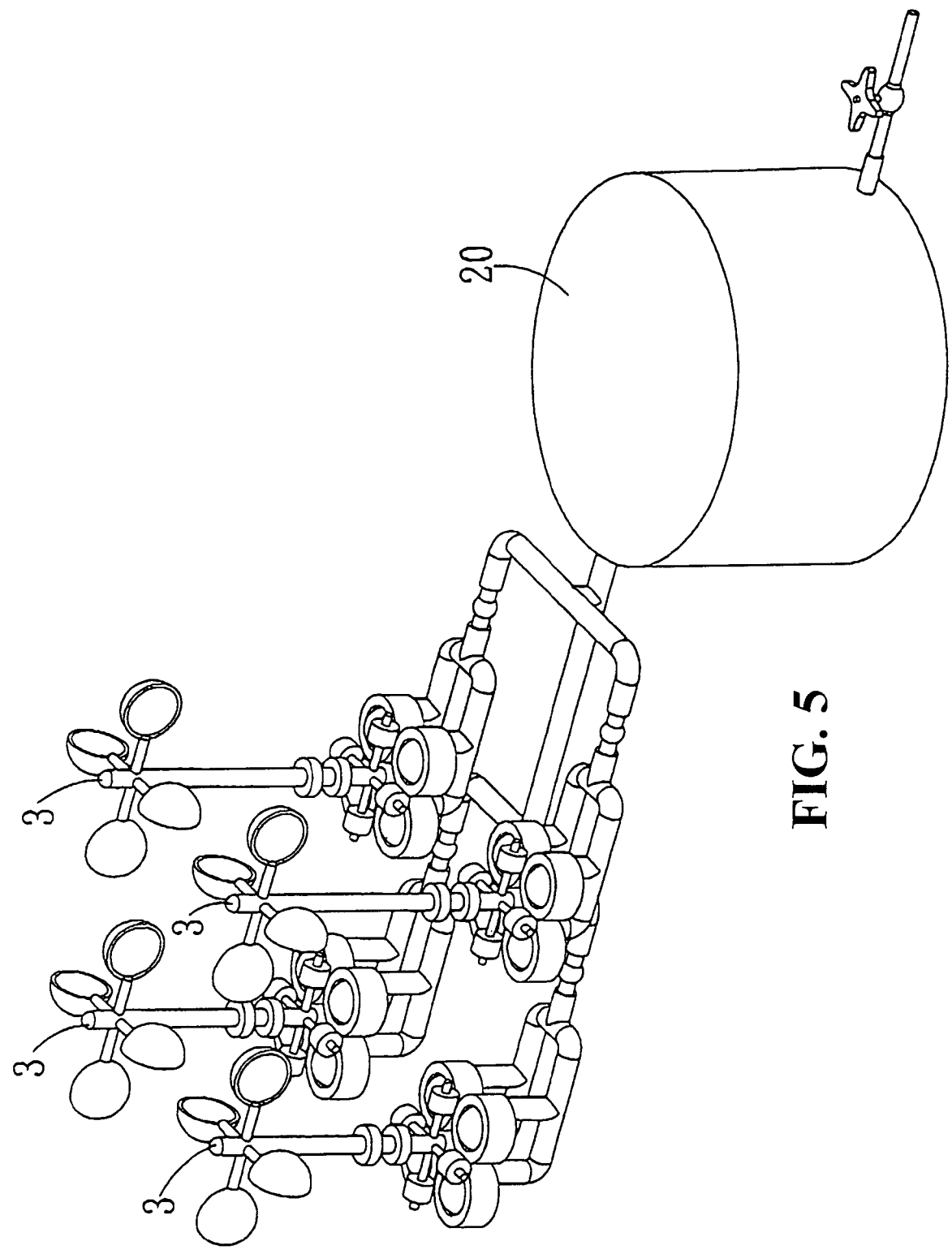
FIG. 5 is a perspective view of FIG. 4 where the main body has been removed.

As shown in FIGS. 1, 4 and 5, the windmill 3 is in combination with the storing cylinder 20. As shown in FIG. 2, the storing cylinder 20 is connected to a storing main cylinder 2. The storing cylinder 20 is provided with a press plug 21, an elastic member 22 (as shown in FIG. 2), an air unidirection inlet 23, an air unidirection outlet 24, unidirectional valves 25, 26 and an air outlet tube 27.

Figure 3:
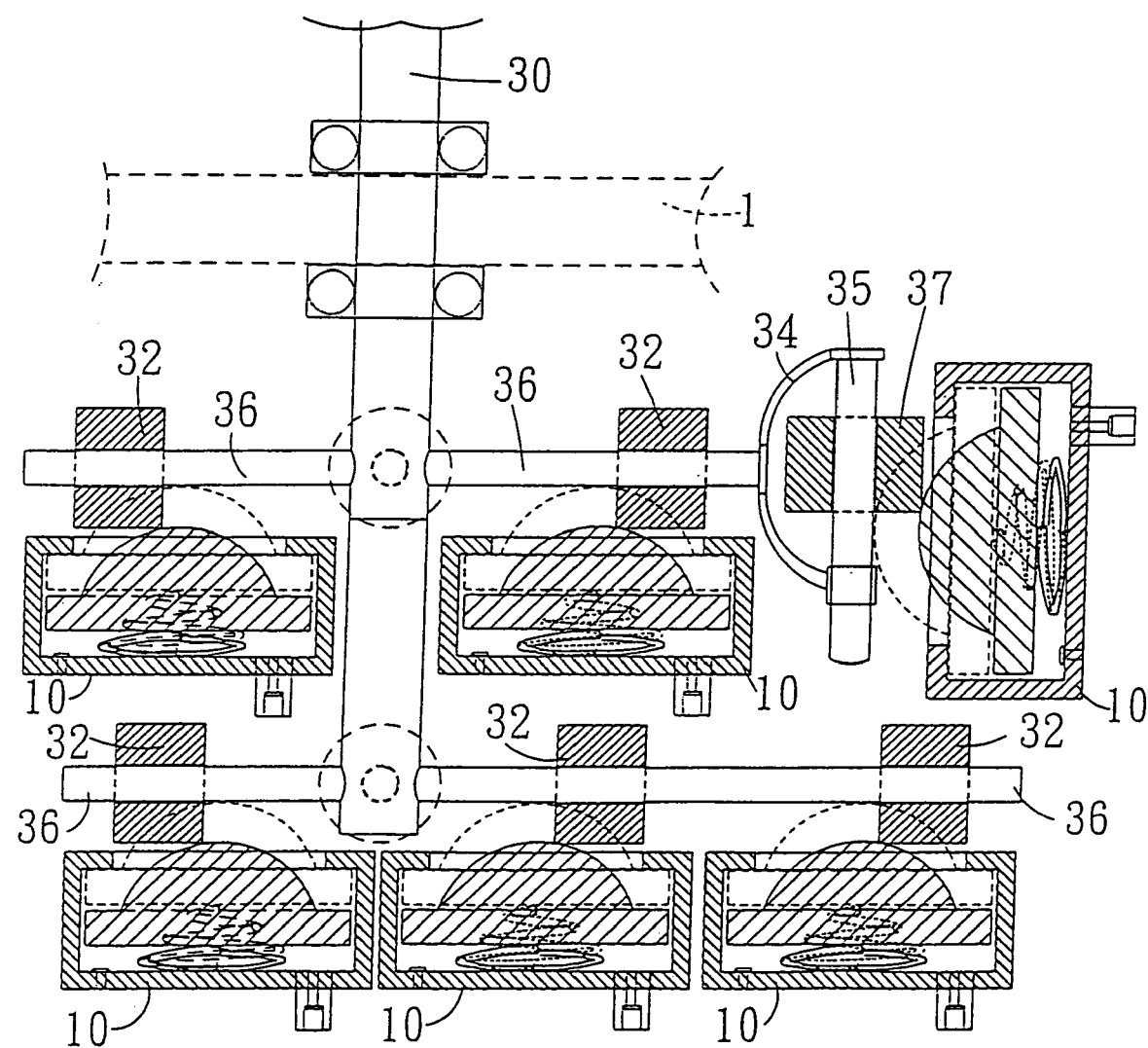
FIG. 3 is a sectional view of another preferred embodiment, wherein the rollers are shown.

The rotating shaft 30 of the windmill 3 is pivotally mounted by means of a pair of bearing 33 to a shaft hole 39 on a main body 1. The blade 31 of the windmill 3 could be any shape and the blade 31 is connected to the rotating shaft 30 by a rod 38. The lower end of the rotating shaft 30 is provided with rollers 32 which are pivotally connected to a connection rod 36. The connection rod 36 can have many rollers 36, and the rollers 36 could be provided in two levels (as shown in FIG. 3). The rollers 32 could be provided in horizontal or in vertical. As shown in FIG. 3, the end of the connection rod 36 is a shaft rack 34 pivotally connected to an axle 35 which is also pivotally connected to a roller 37.

When the roller 32 (37) presses against any protruded portion 13, the piston 12 is pressed to compress inward so as to compress air so that the air will be directed away from the air chamber 10 via the outlet 16 and via the leading tube 19 to the storing cylinder 20. The air to the storing cylinder 20 is continuous flowing in and the press plug 21 will be elevated gradually. When the pressure of the air has increased in a valve, a power member 4 (such as a turbine or generator) is triggered by the storing cylinder 20. The power member will change wind energy into mechanical energy to cause a mechanical movement.

When the piston 12 stops at a point within the air chamber, the piston 12 will be restored to the original position by the spring 14, and at the same time, air is introduced through the unidirectional valve 15 and the valve 17. As shown in FIG. 5, there are four groups of windmill 3 and each group of windmill 3 has four chambers 10, four blades 31 and four rollers 32. The output tubes of the two air chambers are connected in series. The air chambers are also connected in series to the storing cylinder 20.

As shown in FIG. 5, the rotating shaft 3 of the windmill 3 is positioned to the main body 1. The main body 1 is mounted onto the ground.

The windmill 3 is rotated by wind and each blade 31 is provided with roller 32, or the roller 32 is provided in between the blades 31. The blades can be arranged in a multiple of rows to increase the surface area. The rotating shaft could be multiple sets so that the lowest level of the blades drives the rotating shaft of the upper level so that the rotating shaft at the middle level is driven.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pressure storage structure for use in air having a main body, wherein the main body includes a plurality of air chambers, each chamber has an open end, and the chamber contains a piston, an elastic member between the piston and each of the air chambers, a unidirection air outlet, a unidirection valve for inlet air and a unidirection inlet, a unidirection valve for outlet air, the piston is provided with a protruded section protruded from the open end out of the air chamber, the structure includes a windmill fixed to the main body and the wind mill has a rotating shaft pivotally connected to the main body and the rotating shaft is provided with a plurality of blades and rollers, such that the rollers and the protruded sections are in contact and the unidirection outlet of each air chamber is connected to a storing cylinder, the storing cylinder is provided with a press plug, an elastic member, an air inlet, a single direction inlet valve and a gas outlet, a unidirectional valve for outlet air, such that when the blades are rotated by the rotating shaft driven by wind the rollers pass over the protruded sections so that the plug moves inward and the gas is delivered to the storing cylinder, and the air within the cylinder is increasing until the predetermined pressure is achieved, the stored pressure in the storage cylinder passes through the gas unidirectional outlet.

2. The pressure storage structure of claim 1, further includes a storage main cylinder and a plurality groups of windmill, and each group of windmills has a storing cylinder and each storing cylinder is connected in series or in parallel to the storing main cylinder, and the storage main cylinder includes a pressure plug, an elastic member, a gas unidirection inlet, a unidirectional air inlet valve and a unidirection outlet and a unidirectional valve for air outlet.

3. The pressure storage structure of claim 1, wherein the air chambers are connected in series or in parallel to the storing cylinder.

* * * * *